Patented Apr. 8, 1941

2,237,755

UNITED STATES PATENT OFFICE 2,237,755

MANUFACTURE OF ZINC SULPHIDE PIGMENT

Zoltan de Horvath, Western Springs, and William B. Paris, Argo, Ill., assignors to The Eagle-Picher Lead Company, Cincinnati, Ohio, a corporation of Ohio No Drawing. Application August 15, 1936,
Serial No. 96,314

6 Claims. (Cl. 134—78)

Our invention relates to the manufacture and purification of alkaline zincate solutions suitable for use in the manufacture of valuable zinc compounds. The usual method used in the preparations of zinc solutions applicable in the preparation of such zinc compounds, as, for example, zinc sulphate, is carried out through the use of acid such as sulphuric acid on zinc products such as roasted zinc ore, obtained in roasting natural zinc sulphide (sphalerite), zinc oxide, zinc scrap or other zinciferous materials. Such zinc solution prepared by acid extraction is carefully purified, due to the fact that large percentages of the iron, copper and cadmium, as well as other impurities present, pass into solution and must be removed before a sufficiently pure zinc solution can be obtained for the preparation of zinc compounds requiring a high degree of purity.

Among the objects of the invention is the provision of an improved process for extracting zinc values from solutions containing the same by means of precipitation which is not an immediate one but is the result of a series of progressive transformations terminating finally in the production of the sulphide desired.

Another object of the invention is the treatment of the extracted zinc values to produce a zinc sulphide pigment of the highest degree of purity and with qualities hitherto unknown in other zinc sulphide pigments.

Another object of the invention is the provision of a continuous step-by-step method for manufacturing zinc sulphide.

A still further object of the invention is to provide a practical means for manufacturing zinc sulphide pigment in a continuous operation, and in such a manner that nearly all the reagents employed will be recovered in a valuable commercial form, whereby the operation is invested with a higher degree of efficiency than has heretofore been considered possible.

It may be said our invention is characterized by the provision of a continuous method for manufacturing zinc sulphide and in particular by the regulation and control of certain manipulative steps and conditions in the manufacturing process which singly or in combination affect or influence the quality or properties of the finished zinc sulphide pigment.

The present process embodies the use of alkaline hydroxides in cyclical operation, whereby we obtain the maximum yield of zinc in solution, with the minimum consumption of alkaline hydroxides. By this we mean the treatment of the partially extracted and freshly added roasted zinc values with the recovered caustic alkali solutions obtained at later stages in the process, together with the addition of alkaline hydroxides in an amount sufficient to keep the percentage of alkali high enough to possess the requisite extracting power.

When the raw material containing zinc oxide is treated with the solution of alkaline hydroxide, the zinc content passes into solution as alkaline zincate to an extent dependent on the circumstances of the operation. By this we mean that the greater the excess of alkaline hydroxide and the higher its concentration the more effective will be the extraction. In the course of this extraction, two different sludges are formed, one consisting of the partially extracted zinciferous material, which is subsequently re-extracted, and the other principally of hydroxide of iron and siliceous materials, both containing large amounts of extractable zinc. In order to recover this zinc value which is important economically, we have found that the iron and siliceous sludge may be continuously separated from the zinciferous residues by any effective means, and the zinc separately re-extracted therefrom by either alkaline or acid extraction. In addition, the removal of the sludge removes a large part of the iron from the cycle and thereby aids the operation economically. The iron and siliceous sludge may contain up to 30% of the zinc value present in the raw material, and when this is re-extracted by an alkaline solution and the solution returned to the system, we are enabled to increase recovery which makes the operation more practicable from an economical basis. By this means we extract and recover a minimum of 85% of the total original zinc value present. This yields an alkaline zincate liquor which after purification can be used for the manufacture of a marketable zinc sulphide pigment. If the iron sludge is re-extracted with an acid such as sulphuric acid, the solution serves admirably for the production of other zinc compounds, such as lithopone.

Upon the separation of the alkaline zincate solution from the precipitated sludge consisting of iron hydroxide and siliceous matter, it is further treated to remove certain undesirable heavy metal impurities consisting mainly of copper, lead and cadmium. We have found these impurities can be selectively precipitated through the use of elemental sulphur or sulphides of the alkali or alkaline earth group such as barium sulphide. In other words only sufficient sulphur or sulphide is added to precipitate the more insoluble impurities. This is of the utmost importance in our process as the sulphides of copper, lead and cadmium will be carried down in sludge form, leaving the zinc in solution. This addition of sulphur, or sulphides, to precipitate the impurities out of the raw sodium zincate solution can take place in (1) The ore dissolving tanks in which case the sulphides will be processed along with the combined ore and iron sludges.
(2) The decanted, clear, raw, sodium zincate liquors in separate tanks.
(3) Optionally divided between the ore dissolving tanks and separate tanks containing the decanted, clear, raw sodium zincate liquors.

When the sulphur, or sulphide, is added to the decanted, clear, raw sodium zincate liquor in separate tanks the precipitate consisting of the sulphides of copper, lead and cadmium, is in a condition difficult to handle in that it is not readily settled or filtered and clogs up the filter cloth. To overcome this we add lime in fixed amounts which removes the precipitated sulphides and leaves a clear supernatant liquor that is separated by decantation or other suitable means, and yields a purified alkaline zincate liquor in a clear state, free from metallic impurities, which is ready for precipitation of the raw zinc sulphide pigment.

The precipitation is accomplished by adding elemental sulphur in fixed ratios so that precipitation of 90 to 95% of the zinc in solution is effected, the desired ratio being 70 to 90 pounds of sulphur per 100 pounds of zinc in solution. We have discovered that temperature control of the precipitation is of the utmost importance and can best be effected at a temperature not to exceed 40° centigrade until such time as the reaction is practically completed and thereafter applying heat to complete the precipitation. The failure to provide proper temperature control during precipitation will yield a pigment characterized by poor color, low opacity, lack of tinting strength and hiding power. The precipitate formed by the action of sulphur on the alkaline zincate solution comprises zinc sulphide together with zinc oxide in chemical combination, which we call zinc oxysulphide, and is washed by countercurrent decantation or other suitable means to recover the caustic values until the wash water shows an economically negligible caustic content when it is again washed with a controlled pH until the precipitate is appropriately free from alkali and sodium thiosulphate.

The caustic liquors obtained by countercurrent decantation of the precipitate of zinc sulphide and zinc oxysulphide consist principally of alkali hydroxide and alkali thiosulphate in solution. The alkali thiosulphate is formed by the action of approximately 50% of the sulphur used in the precipitation of the zinc sulphide and zinc oxysulphide from the alkaline zincate liquor, the other 50% being consumed in the formation of zinc sulphide and zinc oxysulphide pigment. These liquors are evaporated and the alkali thiosulphates partially removed by crystallization. The mother liquor from the crystallization reverts to the initial extraction of the zinciferous materials, which step constitutes an important economical part of the cyclical operation. Small amounts of the alkali salts such as carbonates, sulphates, chlorides, sulphites, etc., which are less soluble than either the alkali or alkali thiosulphates, crystallize out before them and are periodically removed from the system. The alkaline thiosulphate produced as a by-product is a well-known article of commerce that enhances the economic value of our process.

The raw pigment consisting of zinc sulphide and zinc oxysulphide in slurry form has the approximate chemical composition:

| | Per cent |
|---|---|
| ZnS | 83 |
| ZnO | 11 |
| $H_2O$ | 6 | and is treated with a reagent which coats the pigment particles and produces a soft-textured raw pigment, which, after calcination and subsequent processing, yields a final product that has desirable pigment properties which we believe have been heretofore unknown in connection with zinc sulphide pigment.

We prefer to use as a reagent one selected from the class which is capable of attaching itself to the pigment particles, will yield a white product upon calcination and further processing, and produce with the zinc sulphide a material possessing the above mentioned superior pigment properties which we will later describe in detail. This we accomplish by treatment of the raw pigment in slurry form with a water soluble reagent in solution that is capable of reacting with the pigment in such a manner as to coat the pigment particles and produce the above desired results. Our preferred practice is to employ sodium silicate for this purpose, and, while we do not wish to restrict ourselves to the strength or amount of sodium silicate solution used, we prefer to employ a sodium silicate of 40.6 to 41.6 Bé. containing about 8.6% to 9.1% $Na_2O$ and 28.7% $SiO_2$, that is to say, sodium oxide and silica in the ratio of about 3.22 to 1.

In order to obtain the maximum ultimate yield of finished zinc sulphide pigment and diminish its undesirable zinc oxide content we have discovered that this can be effected by adding elemental sulphur in an amount which when calcined and further processed will decrease the zinc oxide content to the desired percentage by converting it to zinc sulphide. The amount of sulphur to be uesd in this step is in excess of the theoretical sulphur needed to convert the zinc oxide to zinc sulphide.

We next filter, dry and calcine the raw pigment, with exclusion of air during which calcination the sulphur combines with the zinc oxide to form more zinc sulphide. It is then quenched in water with the exclusion of air, after which it is wet ground and treated with sulphuric acid in appropriate amount and concentration to extract the remainder of the zinc oxide content of the calcined pigment as well as the zinc contained in any zinc silicate that may be formed. The zinc sulphate solutions thus obtained which contain free sulphuric acid may be utilized to extract the zinc from the iron sludges produced in the early stages of the process.

The calcined pigment in slurry form after extraction with sulphuric acid is then washed free of zinc sulphate and sulphuric acid content, after which it is brought to the desired point of neutrality or alkalinity by any well-known method.

The next steps are the filtration, drying, dry grinding and packing of the final product for market. This yields a finished zinc sulphide pigment of a quality previously unknown in the paint industry.

The following is given as a specific example of the process, it being our intention not to limit this invention to the example cited, since it is obvious that proportions can be varied without departing from the spirit of the invention.

As raw material we use zinc oxide prepared by roasting zinc sulphide ore (sphalerite) which may have the following analysis:

| | Per cent |
|---|---|
| Zinc | 68.00– 70.00 |
| Copper | .06– .07 |
| Cadmium | .20– .30 |
| Iron | 1.00– 3.00 |
| Lead | .03– .06 |
| Calcium oxide | 1.00– 2.00 |
| Sulphur as sulphur trioxide | 1.50– 3.00 |

As an extracting medium we use a 50% solution of caustic soda prepared by dissolving one part by weight of commercial sodium hydroxide in one part by weight of water. To 100 pounds of roasted zinc ore of the above given composition we add 70 pounds of commercial sodium hydroxide in solution and submit to agitation at a temperature of approximately 80° C. for a period of from three to four hours until the required amount of zinc is dissolved. After extraction is completed, the solution is allowed to cool and settle, whereupon stratification takes place, the partially extracted zinc ore first settling out, followed by a sludge consisting of iron hydroxide and siliceous matter. The clear sodium zincate liquor is carefully drawn off by decantation. The sludge consisting of iron hydroxide and siliceous matter is then removed and subsequently re-extracted with sodium hydroxide for the recovery of occluded zinc oxide. The iron hydroxide obtained by the extraction with sodium hydroxide is suitable as raw pigment for the production of iron pigments which are of commercial value. The strata of iron hydroxide and siliceous matter may, if desired, be extracted with an acid solution, such as sulphuric acid and the zinc sulphate solution obtained used as raw material for the manufacture of lithopone.

The residue is allowed to remain in the extracting tank and additional roasted zinc ore added, together with caustic liquors obtained in the cyclical process, the concentration of which is raised to the proper extracting strength by sufficient raw caustic soda solution, in order to effect cyclical extraction.

The raw sodium zincate liquor is purified by adding selected amounts of sulphur, the amount added being entirely dependent upon the amount of metallic impurities present. In the example cited sulphur would be added in the amount of one and eight-tenths pounds per hundred pounds of zinc in solution. Using this proportional amount of sulphur based on a high-grade ore as given, the impurities are precipitated as sulphides. Calcium oxide (lime) is then added in the amount of ten pounds per hundred pounds of zinc in solution whereby the metallic impurities are rapidly settled. The purified sodium zincate liquor is then removed and is ready for precipitation of the raw zinc sulphide pigment. This is accomplished by adding sulphur in the ratio of 100 pounds of zinc in solution to 85 pounds of sulphur. The temperature conditions are carefully controlled as precipitation is effected at a temperature of approximately 28° C. until the reaction is practically complete, and thereafter heat is applied at a temperature of approximately 95° C. to complete the precipitation. The failure to properly regulate the temperature control during precipitation gives a pigment characterized by poor color, low opacity, lack of tinting strength and hiding power. The precipitate thus formed and which comprises zinc sulphide together with zinc oxide in chemical combination is washed by any suitable means such as countercurrent decantation to recover the caustic values until the wash water shows an economically negligible caustic content, when it is again washed with a controlled pH of approximately 10 until the precipitate is appropriately free from alkali and sodium thiosulphate.

The raw pigment consisting of zinc sulphide and zinc oxysulphide in slurry form comprising approximately 83% zinc sulphide, 11% zinc oxide and 6% water of hydration is next treated with sodium silicate either in the solid form or as a commercial solution, in which latter case we use from 1% to 2% of a solution of sodium silicate of 40° Bé. containing from 8.6 to 9.1% $Na_2O$ and 28.7% $SiO_2$. That is to say, sodium oxide and silica in the ratio of about 3.22 to 1 per 100 parts by weight of solid pigment present in the slurry. The resulting product is then filtered, dried, calcined, quenched with water, acidulated with 1% sulphuric acid to extract the zinc oxide contained in the pigment, filtered, dried and milled. By this treatment we obtain approximately 71 pounds of finished zinc sulphide pigment, together with zinc sulphate solution which may be utilized in the manufacture of lithopone.

In those cases where it is desired sulphur may be added before, simultaneously with, or subsequent to the addition of sodium silicate in an amount sufficient to convert a large part of the zinc oxide content of the zinc oxysulphide to zinc sulphide in the process of calcination. The addition of the sulphur should be in a calculated amount slightly in excess of the theoretical necessary to convert the zinc oxide content of the zinc oxysulphide to zinc sulphide. In the example cited sulphur would be added in the amount of 7 pounds per 100 pounds of dry raw pigment in the slurry. The addition of sulphur not only increases the yield of zinc sulphide pigment but also decreases the yield of zinc sulphate solution obtained in the steps of washing the calcined, quenched and ground pigment in water acidulated with sulphuric acid. By the addition of sulphur we obtain approximately 98 pounds of finished zinc sulphide pigment, together with zinc sulphate solution which may be utilized in the manufacture of lithopone. The additional zinc sulphide recovery represents a notable increase when compared with approximately 71 pounds of finished zinc sulphide pigment when the addition of sulphur is omitted.

The resulting product is filtered and dried preparatory to calcination with exclusion of air at approximately 700° C., during which latter step the sulphur combines with the zinc oxide to form zinc sulphide. It is then quenched in water with the exclusion of air, after which it is wet ground and treated with a 1% solution of sulphuric acid to extract the remainder of the zinc oxide content of the calcined pigment. The zinc sulphate solutions thus obtained which contain free sulphuric acid may be utilized to extract the zinc oxide from the iron sludges produced in the early stages of the process. The calcined pigment in slurry form is then washed free of zinc sulphate and sulphuric acid content before it is brought to the desired point of neutrality or alkalinity by any well-known means.

The next steps are the filtration, drying, dry grinding and packing of the finished zinc sulphide pigment for market.

It is a well-known fact that zinc sulphide pigments are characterized by their tendency to liver, gel, settle, or harden when mixed with a vehicle and made into a paint, enamel, or other coating composition, and because of this there is at present a decided prejudice against zinc sulphide as a pigment. Our zinc sulphide pigment exhibits none of these tendencies and does not liver, gel, settle, or harden when mixed with the vehicle. The remarkable freedom of our pigment from these undesirable characteristics we attribute to the coating of sodium silicate on the zinc sulphide particles prior to calcination and in such manner as to render the particles impermeable to liquids but permeable by gases. In particular the zinc oxide component of zinc sulphide pigments is reactive in the vehicle when present even in minute quantities and causes livering or gelling when allowed to stand. By coating the pigment particle with sodium silicate we effectually seal off the zinc oxide component and thereby render it inactive in the vehicle.

While we have described the use of a sodium silicate of a particular composition in the foregoing example other sodium silicates with different compositions have been used by us in the practice of our invention with equally satisfactory results and it is understood our process is not limited to the use of sodium silicate having the composition disclosed, but includes those with different chemical analysis.

Having thus described our invention, what we claim as new and desire to secure by Letters Patent is:

1. The process of preparing pigments which comprises coating particles of zinc oxysulphide with an aqueous solution of sodium silicate, drying, mixing with sulphur and calcining under exclusion of air to convert the oxysulphide into zinc sulphide and simultaneously render the pigment particles impermeable to liquids.

2. The process of making a zinc sulphide pigment which comprises roasting zinc sulphide, mixing and heating said roasted zinc sulphide ore with a 50% solution of sodium hydroxide in such amount and concentration to produce sodium zincate liquor together with precipitated sludge, separating the solution of sodium zincate liquor from the precipitated sludge, precipitating metal impurities from the sodium zincate liquor by the addition of an amount of sulphur sufficient only to precipitate the impurities, settling the impurities with lime while leaving the zinc in solution, treating the resulting purified solution of sodium zincate liquor with sulphur in the ratio of 85 pounds to 100 pounds of zinc in solution at a temperature of approximately 28° C., washing the resulting precipitate until the precipitate is approximately free from caustic content, adding to the zinc sulphide in the form of slurry a solution of sodium silicate, adding sulphur and calcining with exclusion of air, treating with a dilute solution of sulphuric acid to remove the zinc oxide content of the calcined pigment and neutralizing.

3. The improvement in the method of preparing pigment zinc sulphide in a two-stage operation, in the first stage of which crude zinc oxide is mixed with alkaline hydroxide to form an alkaline zincate solution, comprising treating the alkaline zincate solution with sulphur in an amount calculated to be only sufficient to precipitate impurities, filtering, mixing the purified alkaline zincate solution with sulphur in the ratio of 85 pounds to 100 pounds of zinc in solution, and precipitating the pigment zinc sulphide at a temperature of approximately 28° C., and in the second stage in which said particles of pigment zinc sulphide in the form of slurry have added a solution of sodium silicate prior to calcination, calcining the same, quenching with water, acidulating with sulphuric acid to change the zinc oxide present to sulphate, and finally washing the pigment zinc sulphide.

4. The improvement in the process of treating roasted zinc sulphide ore for the production of pigment zinc sulphide which comprises mixing and heating the roasted zinc sulphide ore with sodium hydroxide in such amount and concentration as to produce an alkaline zincate solution, separating the alkaline zincate solution and adding sulphur in an amount calculated to be only sufficient to precipitate the impurities, expediting the settling of the said impurities by the addition of lime and separaing the zincate solution, adding sulphur to the resulting purified solution of sodium zincate and heating to not exceeding 28° C. to precipitate zinc oxysulphide, adding sodium silicate solution and subjecting said zinc oxysulphide precipitate to calcination in the presence of sulphur, quenching in water with the exclusion of air, washing with sulphuric acid and neutralizing.

5. The improvement in the process of treating roasted zinc sulphide ore for the production of pigment zinc sulphide which comprises mixing roasted zinc sulphide ore with sodium hydroxide in solution and heating the same to produce alkaline zincate solution, separating the solution of alkaline zincate, purifying the solution of alkaline zincate by the addition of sulphur in an amount calculated to be only sufficient to precipitate the impurities while leaving the zinc in solution, treating the resulting purified solution of alkaline zincate with sulphur in the ratio of 85 pounds to 100 pounds of zinc in solution at a temperature of approximately 28° C., washing the resulting precipitate by counter-current flow to reduce the caustic content, adding sodium silicate solution in an amount sufficient to coat the surface of the pigment particle, calcining the resulting precipitate, acidulating with a dilute solution of sulphuric acid to extract zinc oxide, and washing the resulting product free of zinc sulphate and sulphuric acid content.

6. The method of treating crude pigment zinc sulphide precipitated from an alkaline zincate solution to produce a purified finished product which comprises adding a solution of sodium silicate to coat the surface of the pigment particles, adding free sulphur and calcining the same with exclusion of air, treating with sulphuric acid to extract the zinc oxide content and washing to remove any residual acid or zinc sulphate present.

ZOLTAN DE HORVATH.
WILLIAM B. PARIS.